United States Patent [19]
Hughes

[11] Patent Number: 5,892,391
[45] Date of Patent: Apr. 6, 1999

[54] TRIAC/SCR PROPORTIONAL CONTROL CIRCUIT

[75] Inventor: Wallace J. Hughes, Boston Lake, N.Y.

[73] Assignee: The United States of America as represented by the United States Department of Energy, Washington, D.C.

[21] Appl. No.: 923,629

[22] Filed: Sep. 4, 1997

[51] Int. Cl.[6] .................................................. H03K 17/72
[52] U.S. Cl. ........................... 327/438; 327/447; 327/451
[58] Field of Search ............................. 327/79, 101, 438, 327/447, 451, 452, 453

[56] References Cited

U.S. PATENT DOCUMENTS 4,860,149  8/1989  Johnston ................................... 361/79

*Primary Examiner*—Timothy P. Callahan
*Assistant Examiner*—Jeffrey Zweizig
*Attorney, Agent, or Firm*—William R. Moser; Paul A. Gottlieb

[57] ABSTRACT

A power controller device which uses a voltage-to-frequency converter in conjunction with a zero crossing detector to linearly and proportionally control AC power being supplied to a load. The output of the voltage-to-frequency converter controls the "reset" input of a R-S flip flop, while an "0" crossing detector controls the "set" input. The output of the flip flop triggers a monostable multivibrator controlling the SCR or TRIAC firing circuit connected to the load. Logic gates prevent the direct triggering of the multivibrator in the rare instance where the "reset" and "set" inputs of the flip flop are in coincidence. The control circuit can be supplemented with a control loop, providing compensation for line voltage variations.

19 Claims, 7 Drawing Sheets

SCR/TRIAC POWER CONTROLLER

*A + OR - 0 CROSSING (HALF WAVE) DETECTOR
COULD BE USED INSTEAD OF THE ZERO CROSSING (FULLWAVE) DETECTORS

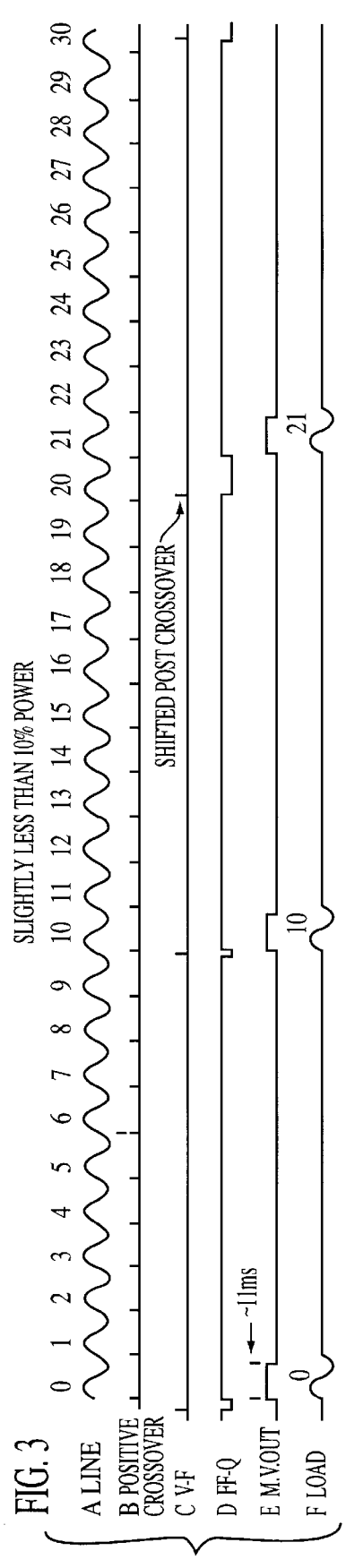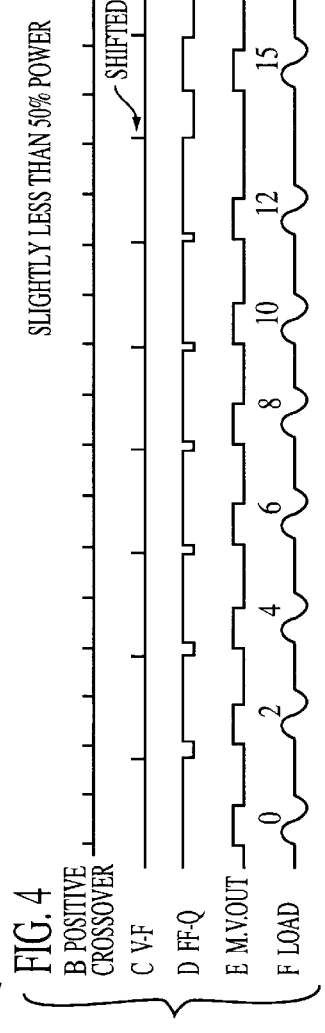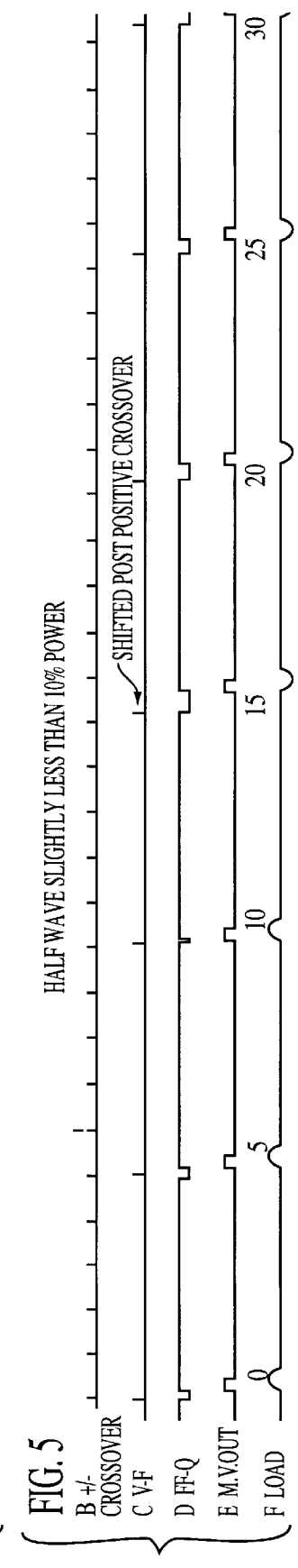

SECOND EMBODIMENT

FIG. 7 THIRD EMBODIMENT

FIFTH EMBODIMENT

TRIAC/SCR PROPORTIONAL CONTROL CIRCUIT

GOVERNMENT CONTRACT RIGHTS

The invention described herein was made and/or conceived in the course of or under a contract of the U.S. Department of Energy, according to which the United States Government has rights in this invention and title thereto is in the Department of Energy.

BACKGROUND OF THE INVENTION

This invention relates to power controllers, specifically those for use in controlling the power applied to heating elements used in annealing of very large metal objects. In particular this invention is useful in the annealing of installed and irradiated nuclear reactor pressure vessels. More particularly, this invention relates to power controller devices which provide high resolution linear power adjustment of the power applied, thereby obviating the need for measurement of power delivered to the load by the power controller for control purposes. The load may be a heating element, for example.

Many types of power controller devices are known in the prior art. The simplest power controller, known for a century or more, uses a rheostat or a variable ratio transformer to control the delivered power. For simple annealing, such as small glass kilns, such devices suffice. This approach suffers the disadvantage, however, of having non-linear control. That is, the "operator" controls current or more usually voltage approximately linearly, but the power delivered is proportional to the square of the varied quantity, so that the control (i.e., the responsiveness of the power delivered to changes in current or voltage) is inherently quadratic, not linear. Sophisticated annealing tasks, such as the annealing of nuclear reactor pressure vessels, require the accuracy of linear control, i.e., a linear variation in the power delivered in response to an operator-controlled change in current or voltage.

The standard approach to achieving linear power control has been to use systems which turn the power on for a portion of a fixed duty cycle, typically one or two seconds. Although the delivered power is quadratic in response to changes in the current or voltage, the amplitude of the AC current of the delivered power is approximately constant over the duty cycle, and hence the average power delivered over the duty cycle is linear with the proportion of time the delivered power is "on." The response time of the change in temperature of heating elements and the heated object to be annealed are such that time-varying power levels by turning the current on and off over one or two seconds has negligible effect on the temperature achieved.

Unfortunately, however, there are practical problems in using conventional systems to control heating elements used in sophisticated annealing such as that of nuclear reactor pressure vessels. The prior art linear power controller, which has been in use until the present invention, produces large step increases in power, especially at low percentages of delivered power, in reponse to changes in the controller settings, even with linear input control, because it can only add or subtract an integral cycle of the 60 Hertz (Hz) power signal, thereby producing highly discontinuous changes in delivered power level.

Increasing the length of the duty cycle helps but does not fundamentally alleviate the problem. Measurement of power delivered to the object to be annealed is therefore required to assure that actual power levels obtained are known to an acceptable accuracy.

In prior art designs using the above-described standard approach, 60 Hz power to the load is controlled using an on or off system with a fixed duty cycle such that integral numbers of complete 60 Hz sine cycles (synchronized to the line frequency) are applied to the load during the "on" portion of the controller duty cycle and no power is delivered during the "off" portion. For example, as illustrated in FIG. 1, at an input command of 10% power with a one second duty cycle, the controller should output to the load six complete 60 Hz cycles of power (0.1 second) every 60 cycles (1.0 second). Consequently, at low percentages of maximum deliverable power there is a significant time during which no power is applied to the load (e.g., 54 cycles at 10% power).

As described above, a problem inherent in this type of control is that large relative changes in power delivered are inherent at low absolute levels of power because the current can only change by an integral number of cycles. The control is thus grossly discontinuous in this region of operation. This problem can be referred to as granularity of control.

For example, an increase in power using this type of controller from six cycles or 10% power to seven cycles or 16% power is actually a relative change of 17% (one cycle out of six) in power being delivered. At 50% power (see FIG. 1), the load waveform for a duty cycle of one second supplies power for 30 cycles and is then off for 30 cycles. Specialty applications such as nuclear reactor annealing require not only the linearity of control offered by duty cycle systems but also precision of change of power level of one in a thousand, i.e., a resolution of 0.1% in relation to the 100% power level. With conventional controllers it has been necessary to measure load power due to the uncertainty at this level, especially at low power percentages. The added instrumentation required for feedback from the measurement of delivered power adds complexity and expense to the power controller apparatus. These measurements are also complicated due to the burst or discontinuous nature of the applied waveform.

Some improvement in resolution at low duty cycles can be achieved by increasing the total length of the duty cycle, e.g., to two seconds. In this case, a 20% power level is provided by 12 cycles out of 120 cycles; the next step increase in power is to 13 cycles or approximately 10.8% power and therefore a change of only about 8% (one cycle out of 12). Although improved, this technique still has significant granularity and still requires measurement of load power for accuracy of control.

Thus there is a need for a simple and convenient power controller providing both linearity and high resolution in power control for meeting annealing specifications. In particular, reactor vessel annealing requires a well controlled, slowly changing, uniform heat distribution to preclude thermal stresses. The accuracy and the resolution of control of input power directly affects the uniformity of temperature which in turn directly controls the likelihood of a successful annealing. Uniformity is accomplished with multiple heater banks comprising a sufficient number of well controlled electrical heating elements. Step changes in electrical power input, and thus heat input, disrupt both the uniformity and the slow rate of change, potentially causing damaging thermal stresses.

In addition, the annealing of particular interest is for an installed, previously operated nuclear reactor vessel. Installed shielding materials are subject to heat damage at temperatures only slightly above minimum annealing temperatures. The margin between acceptable minimum annealing temperatures and maximum safe temperatures for these materials is very narrow. It is therefore extremely important that vessel temperature uniformity, and thus control of electrical input to the heating elements, be as precise as is practical to assure that the entire vessel has reached the necessary annealing temperature but also stays below maximum temperature constraints.

Two other factors which affect the degree of temperature control and uniformity are variations in line voltage and the tendency of heating elements to increase resistance with increasing temperature. It would be useful to be able to feed back to the control system for adjustment of the input control voltage a signal based on changes in the amplitude of the line voltage and another signal based on the temperature of the heating element to maintain stability and control. The granularity of the prior art control system makes use of such signals for fine control problematic.

When feedback signals are used, random noise in the input channel potentially subjects the system to a well known problem with feedback loops, oscillation. Thus there is also a need in systems using feedback signals to be able to minimize susceptibility to input noise. The current invention answers all of these needs.

SUMMARY OF THE INVENTION

The present invention provides a stepless, linear, high resolution power control circuit for controlling AC power applied to a load, said power control circuit comprising (1) a converter for converting an analog input voltage to a first output pulse signal with a frequency linearly related to the input voltage, said converter being capable of providing a predetermined output pulse signal width; (2) a detector for generating a 60 Hertz or 120 Hertz zero crossing second output pulse signal syncronous with an AC input signal synchronized with the said load power voltage and having a second predetermined-output pulse width; and (3) a flip-flop for activating a monostable multivibrator, the reset input of said flip-flop being coupled to said converter and responsive to said first pulse signal, and the set input of said flip-flop being coupled to said detector and responsive to said second pulse signal.

Because of the combination of linearity and high resolution of the present invention, straightforward feedback techniques for line power, temperature, and other variables which affect uniformity, are possible. Inherent noise immunity of the voltage to frequency conversion used in the present invention eliminates the requirements for current loop control, thereby permitting simpler control signals. In addition, the system can utilize a voltage to frequency converter with a large multiple of 60 Hz base frequency with frequency dividers to reduce the control pulses to the range 0 to 60 Hz. This approach vastly reduces the impact of any input noise.

An object of the invention is to provide a power controller which, by virtue of its high resolution, linearity, and accuracy, eliminates the need to measure power output in such an apparatus.

A further object of this invention is to provide a power controller having a reduced number of components and a lower cost of production by eliminating the need to measure load power.

Still other objects, features, and advantages of the present invention will become readily apparent to those skilled in this art from the following description of a presently preferred embodiment of this invention. As previously indicated, the invention will be set forth in part in the description that follows and in part will become apparent to those skilled in the art upon examination of the following or may be learned with the practice of the invention by means of the instrumentalities and combinations particularly pointed out in the appended claims. Accordingly, the following description and attached drawings are illustrative and not restrictive.

BRIEF DESCRIPTION OF THE DRAWINGS

The accompanying drawings, incorporated in and forming a part of the specification, illustrate several aspects of the present invention and, together with the written description, serve to further explain the principles of the invention.

FIG. 3 is a timing diagram of a power controller according to the invention operating at slightly less than 10% power.

FIG. 4 is a timing diagram of a power controller according to the invention operating at slightly less than 50% power.

FIG. 5 is a half wave timing diagram of a power controller according to the invention operating at slightly less than 10% power.

DETAILED DESCRIPTION OF THE INVENTION

The present invention provides many advantages over conventional techniques. This invention provides continuous duty cycle power control function without significant step increases in power. Moreover, the present invention can be designed for high immunity to control signal noise. The invention is easily adaptable to controlling output based on a variety of input or feedback signals returned to the analog input. Further, all analog circuits can be isolated from the power circuits through optical or transformer coupling of the V-F output. The remainder of the circuit can be included in the SCR/TRIAC control module. Still further, the present invention provides control resolution of at least three orders of magnitude, and further improvements can be made using V-F converters now in existence which are capable of spanning seven orders of magnitude. Finally, this invention comprises a simple circuit with a low parts count and hence is reliable and easy to manufacture.

To achieve the foregoing and other objects, the present invention uses a control circuit with a frequency output proportional to an input voltage or current to vary the duty cycle of a silicon controlled rectifier (SCR) or a three terminal AC controller (TRIAC) which provides pulses of power to the load as determined by the input voltage or current. A silicon controlled rectifier is a solid state diode device which only conducts in one direction and only when its control electrode is biased with a certain control voltage. A TRIAC is a solid state device which conducts in both directions but only when its third electrode is biased with a certain control voltage.

In particular, the current invention achieves improved power control by proportionally and finely controlling the AC power applied to the load with pulses synchronous to the AC line voltage through a TRIAC or SCR. The invention achieves these results by means of a control circuit comprising: a converter which converts an analog input voltage linearly to a pulsed output with a fundamental frequency proportional to the input voltage such that the output pulses have a narrow predetermined pulse width; a zero crossing detector which generates a 60 Hertz or 120 Hertz narrow pulse signal synchronized with the AC power voltage; a flip flop circuit which triggers a monostable multivibrator, with the V-F converter controlling the "reset" input of said flip flop, and the zero crossing detector controlling the "set" input of said flip flop, such that only after both signals have arrived will the flip flop activate the SCR or TRIAC; and a logic gate for assuring that the monostable multivibrator is controlled by the flip flop to preclude the rare instance where the set and reset condition are in coincidence.

Figure 1:
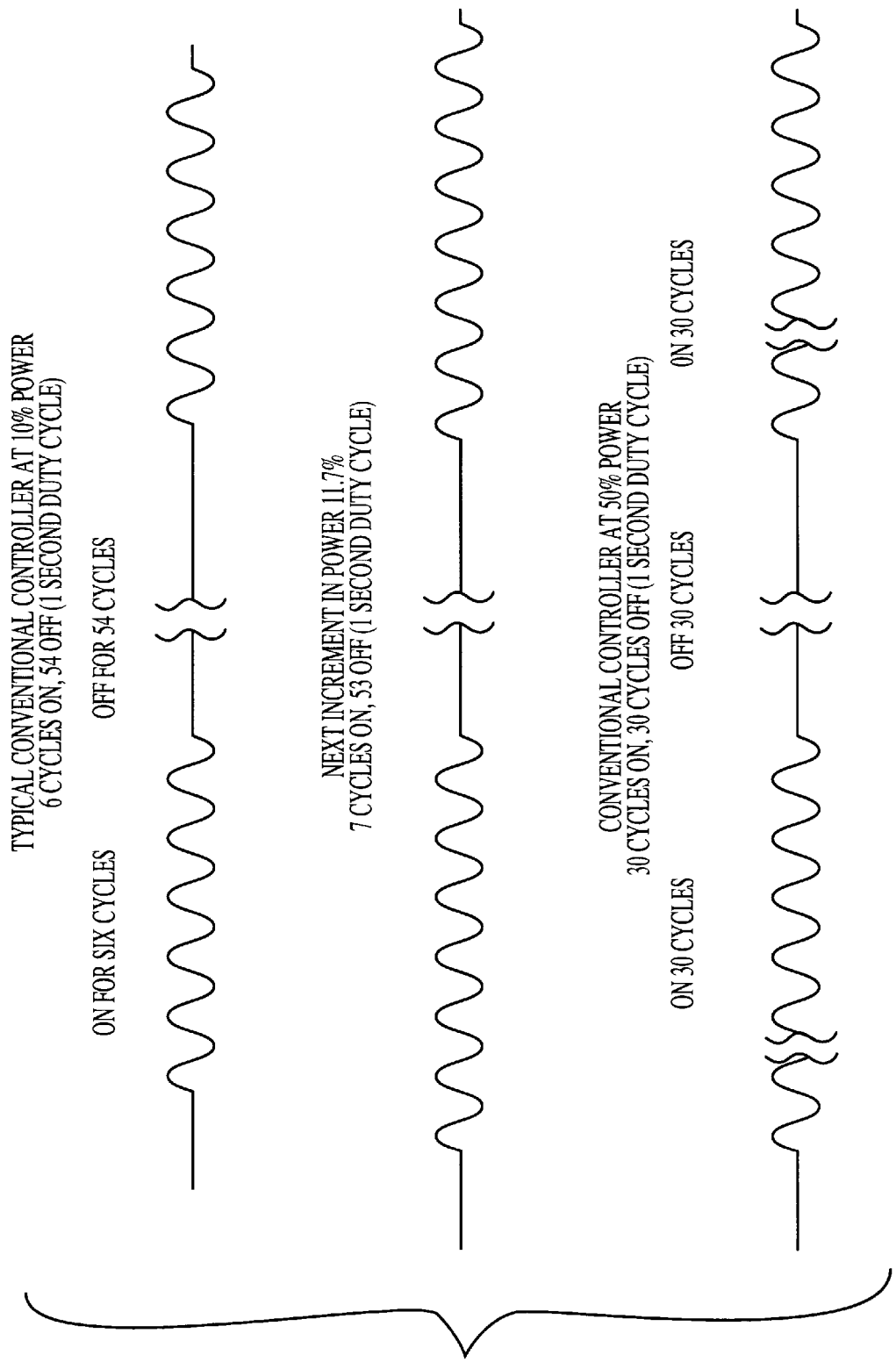
FIG. 1 is a timing diagram for the conventional prior art power controllers at 10%, 11.7% and 50% power, respectively.
Figure 2:
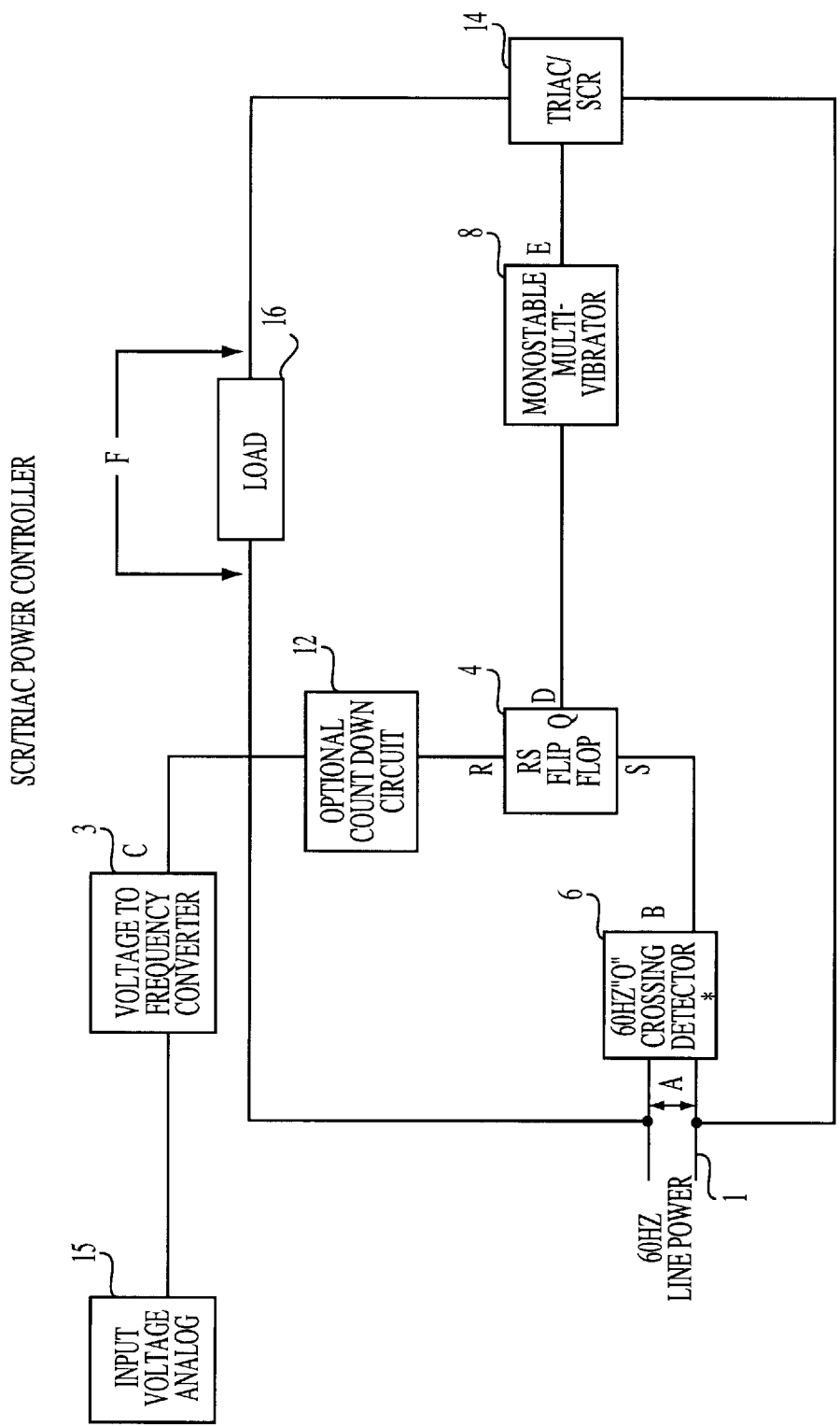
FIG. 2 is a schematic diagram of a power controller in accordance with a first embodiment of the present invention.

Referring to the drawings, as previously indicated, FIG. 1 illustrates the granularity of the power delivered by the prior art controller. FIG. 2 schematically shows a presently preferred embodiment of the power controller device of this invention. This simplest embodiment of the invention comprises a voltage to frequency (V-F) converter (3), a 60 Hertz zero crossing detector (6), a reset-set (R-S) flip flop circuit (4), a monostable multivibrator (8) and a TRIAC or Silicon Controlled Rectifier (SCR) power circuit (14). These elements are standard electronic hardware or modules whose operating characteristics are described in electronic reference materials and/or catalogs which will be known to those skilled in the art. A + or − zero crossing (half-wave) detector can be used instead of a fullwave zero crossing detector.

The invention involves the use of a linear voltage to frequency (V-F) converter (3) to produce a pulse signal which in combination with other pulse signals provides finely resolved linear AC power control. An output pulse of the V-F converter (3) at a frequency which is a fraction less than one of the AC power line is required to enable the flip flop circuit to pulse the SCR or TRIAC which controls the power circuit. It does so by resetting the flip flop circuit, which then is enabled to activate the SCR or TRIAC when it receives a set pulse from the zero crossing detector circuit (6). The detector circuit (6) produces a pulse when it obtains a positive going zero voltage and activates the enabled (i.e., reset) R-S flip flop (4). The pulse from R-S flip flop (4) activates the SCR or TRIAC power circuit (14). This apparatus in effect varies the duty cycle of the applied power continuously to achieve finely resolved linear control, and such resolution results in the initial application of power (1) to the load (16) at very close to zero input voltage. Half wave power cycles can alternatively be selected by using a + and − zero crossing (halfwave) detector instead of the positive zero crossing (fullwave) detector.

As shown in FIG. 2, an analog input voltage source (15) produces a voltage proportional to the desired delivered power level which is supplied to a voltage to frequency (V-F) converter (3). The analog input voltage comes from a variable voltage source. The output of the V-F converter is arranged either directly or through a countdown circuit (12) to provide an output pulse to the flip flop whose frequency varies from slightly above zero to slightly greater than 60 Hertz with an output pulse width on the order of 1 microsecond, the actual pulse frequency being in direct proportion to the analog input voltage. A 60 Hz zero crossing detector circuit (6), driven by the AC signal source common to the main AC power circuit, generates a positive going zero crossing signal synchronous with the 60 Hz power signal. This detector circuit (6) also has an output pulse width on the order of 1 microsecond, which is supplied to the flip flop (4).

The V-F signal is arranged to drive the "reset" side of an R-S (reset-set) flip-flop (4). The 60 Hertz zero crossing signal is arranged to control the "set" side of the R-S flip flop. Each pulse from the V-F converter resets the flip flop. The next consecutive "0" (zero) crossing pulse from the 60 Hertz zero crossing detector (6) sets the flip flop and triggers a 10 millisecond multivibrator "on" pulse. The SCR/TRIAC includes an interface that provides isolation and signal power amplification adequate to trigger the SCR/TRIAC.

Since the monostable multivibrator (8) is triggered synchronously with the positive "0" crossing of the 60 Hertz power signal and the pulse width of the output pulse of the multivibrator (8) is in excess of 8.33 milliseconds, but less than the 16.6 milliseconds, the power circuit will be triggered for one complete cycle of the AC line power. The output of the V-F converter (3) is a pulse signal with frequency proportional to the linear voltage input. Because the monostable multivibrator is in the "on" condition only when the flip flop and the V-F pulses are in the necessary synchronization, the delivered power is a pulse that only occurs once in every N cycles, where N=100% divided by the power percentage input associated with the input voltage selected to be applied to the V-F converter. The resolution of the average delivered power is thus the resolution of the V-F converter.

For example, considering the operation at 10% power, the TRIAC/SCR is triggered by the monostable multivibrator output so that one complete 60 Hertz cycle of the line power out of every 10 is applied as the delivered power to the load. The V-F converter is set to produce a pulse slightly faster than every 0.167 seconds (6 Hz) by virtue of its design, which resets the R-S flip flop. The 60 Hz crossing detector produces a pulse every cycle, which sets the flip flop. Since the V-F resets the flip flop just prior to the set by the 60 Hertz zero crossing signal, a pulse is produced out of the flip flop every 0.1 second which triggers the monostable multivibrator. This in turn fires the TRIAC or SCR device (14) for one cycle, thereby producing the desired 10% power applied to the load.

FIG. 3 illustrates the waveforms present at locations A, B, C, D, and E of FIG. 2 at slightly less than 10% power level. The operation at slightly less than 10% power illustrates how the V-F and zero crossing detector signal interact with the flip flop to apply one complete 60 Hertz voltage cycle to the load approximately every 10 cycles. It also illustrates the shifting of the V-F output pulse outward, which causes the output at D and E in FIG. 3 to shift and thus move out by one cycle the applied voltage signal. This shift causes a slight power reduction. At exactly 10% commanded power, one cycle for every 10 would be applied continuously as stated at the beginning of this paragraph.

At an analog input voltage command of 10.1% power (a 1% change from 10%) the output of the V-F is slightly greater than 6.06 Hertz. Therefore a single, full 60 Hertz cycle of power would be applied to the load once every 10 cycles for 9, 10-cycle intervals and then in the 10th interval the power is applied 8 cycles later instead of 9 cycles producing a total of 10 "on" cycles for a total of 99 cycles or an average power of 10.1%. The same analysis applies for any level of commanded power due to the linear nature of the V-F converter.

At 50% power, every other 60 Hertz cycle is applied to the load or the repetition rate is 30 Hertz. The frequency output of the V-F is slightly greater than 30 Hertz and the crossing detector generates a R-S set every 60 Hertz. The operation at slightly less than 50% power level is illustrated in FIG. 4. Another way of looking at this performance is that the V-F converter output frequency, which is proportionally controlled by the commanded power signal, forces the applied power duty cycle to be related to the inverse of the (V-F) output frequency (to within +/−1 cycle to allow for zero crossing detector frequency jitter).

By comparison to the conventional power controller illustrated in FIG. 1, it is obvious that the power is applied much more uniformly and regularly. At 10% and 50% power with a 1 second duty cycle, the conventional power controller applies power every second for 6 cycles and 30 cycles respectively. This leaves an off period of 54 cycles and 30 cycles respectively. The invention supplies power every 10 cycles and every other cycle for 10% and 50% power, respectively.

Figure 6:
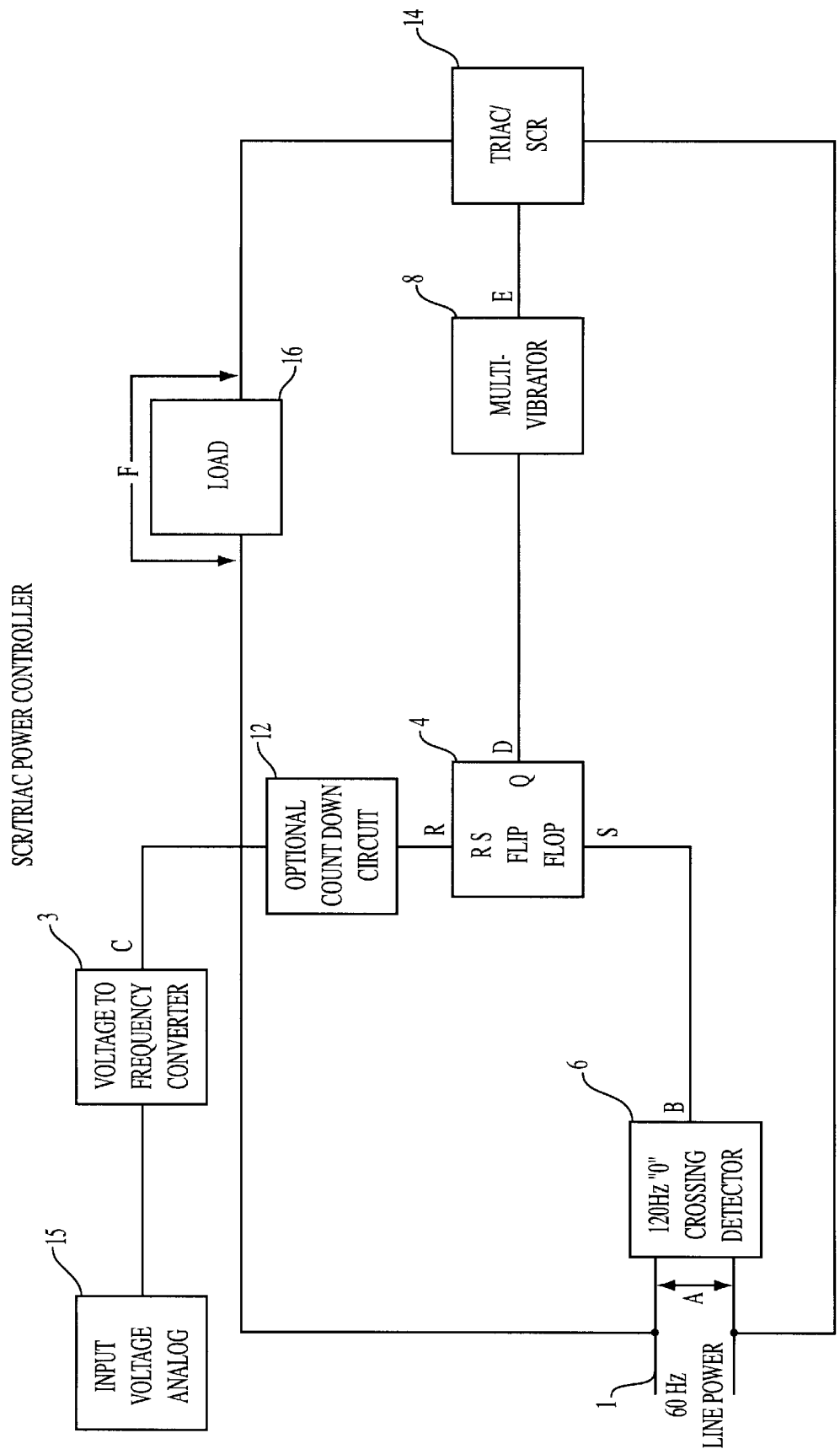
FIG. 6 is a schematic diagram of a power controller in accordance with a second embodiment of the present invention.

A second embodiment illustrated in FIG. 6 uses a half cycle power cycle by employing a two way or +/− zero crossing detector trigger signals (120 Hz) instead of only an up detector as well as a multivibrator with less than an 8 millisecond pulse. The performance of this embodiment is illustrated in FIG. 5. This approach smooths the input power by a factor of two. The disadvantage to this approach is possible saturation of the power transformer powering the control circuit at frequency multiples which select consecutive positive or consecutive negative cycles.

Figure 7:
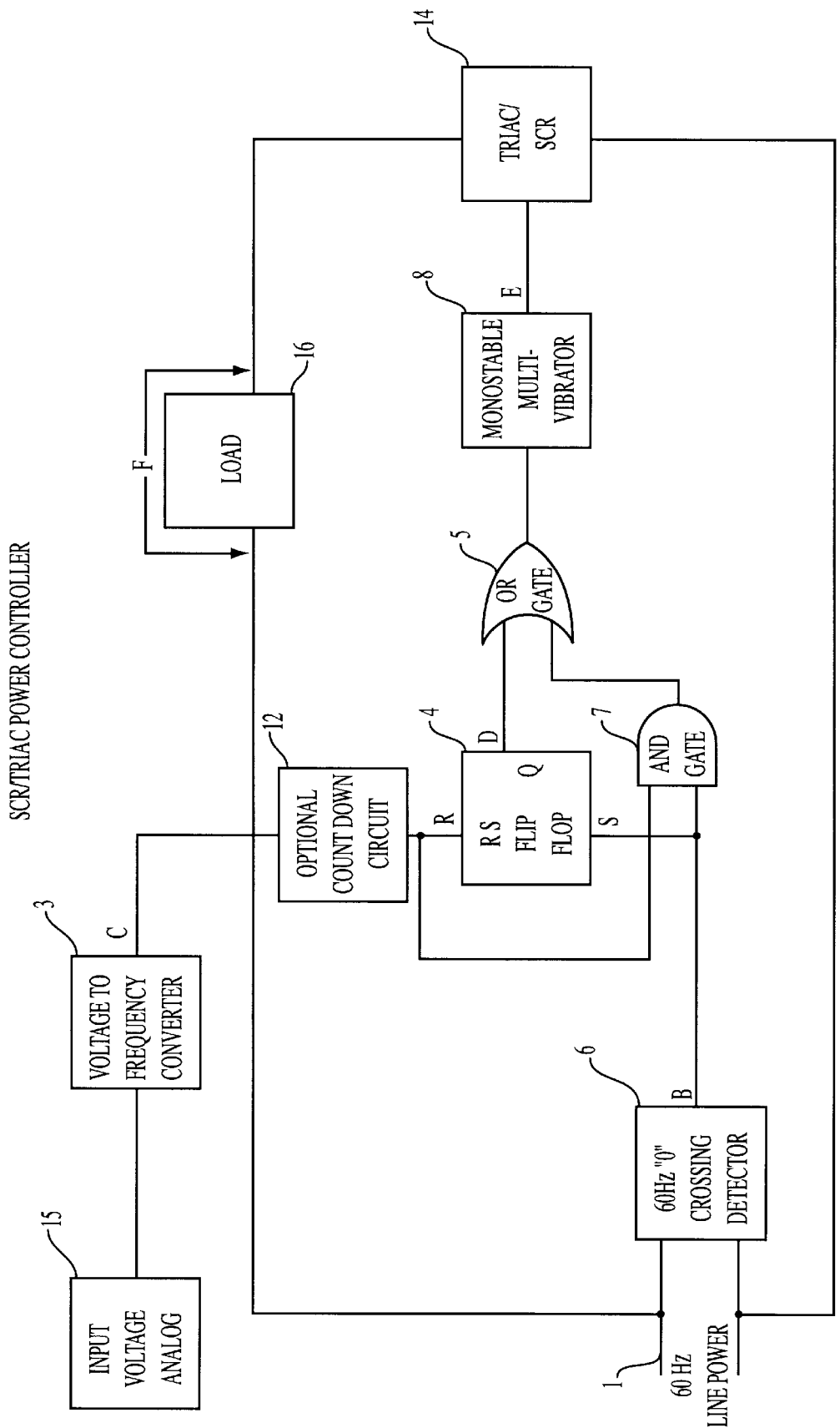
FIG. 7 is a schematic diagram of a power controller in accordance with a third embodiment of the present invention.

Another embodiment is illustrated in FIG. 7. In this embodiment an "AND" gate (7) and an "OR" gate (5) preclude the rare instance when both the set and reset are in coincidence and, in that case, trigger the monostable multivibrator directly.

Figure 8:
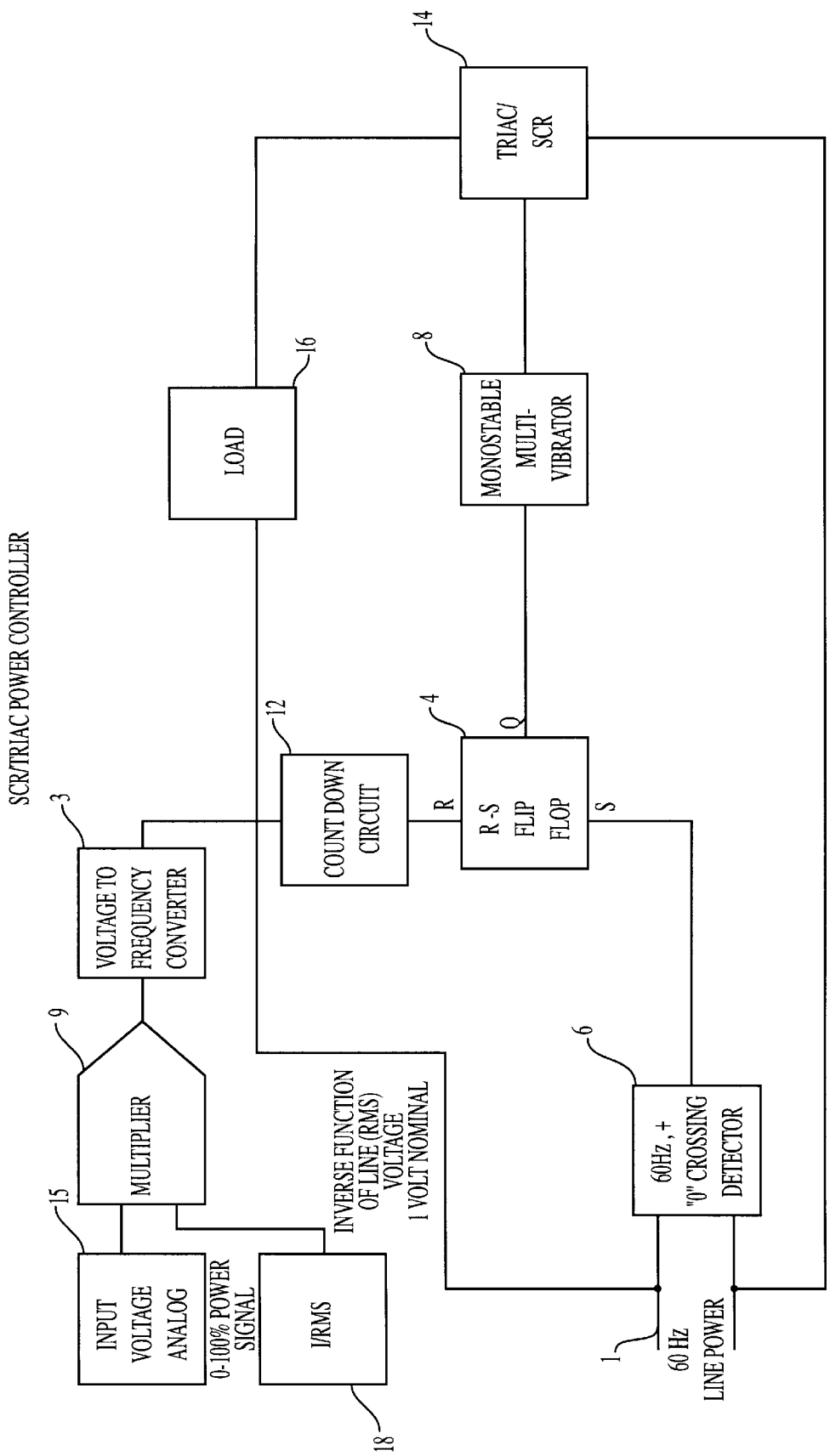
FIG. 8 is a schematic diagram of a power controller in accordance with a fourth embodiment of the present invention.

Highest accuracies of control require modification of the control signal to null the effect of line voltage changes. FIG. 8 adds this feature by incorporating a true RMS signal (18) to appropriately modify the control signal. The accuracy of the voltage to frequency converter (3), the root means square (RMS) converter (18), and multiplier (9) should be chosen for the desired accuracy of signal to power level conversion, as shown in the simplified block diagram of FIG. 8. The accuracy of the voltage to frequency converter (3) is the only component that directly effects the accuracy of signal to power level conversion. The accuracy of the voltage to frequency converter (3) should be commensurate with the overall desired performance.

The features described above can be provided as a power controller, when the controller function is supplemented with a control loop, as shown in FIG. 8. FIG. 8 includes the basic aspects of the present invention, as set forth in FIG. 2, and in addition provides a signal which is inversely proportional to RMS line voltage. By using the multiplier (9), the RMS voltage (18) inversely proportional to the power line voltage (1) can be used to modify the input voltage signal to correct for line voltage changes. As shown in FIG. 8, this function of power line voltage (nominal line voltage would be equal to one) is multiplied with the desired power signal through the use of an analog multiplier (9) (i.e., Burr Brown 4214). The resulting signal is passed to the V-F converter (3). As stated, the output of the V-F converter can be arranged directly or through a countdown circuit (12), which divides the high frequency down to an acceptable range of 0 to slightly greater than 60 Hertz. The control signal in this configuration is proportional to power.

Analog components as shown in FIG. 8 are readily available with the following accuracies. The Burr-Brown VFC62 voltage to frequency converter specification has a linearity as high as 0.005% maximum at 10 Kilohertz fullscale with scale and gain drifts on the order of +/−50 parts per million (ppm) of Full Scale Reading/degrees Centigrade (FSR/deg C.). Multipliers such as the Burr-Brown AD632 are accurate to +/−0.5% with a temperature coefficient of 0.01% per degrees C. The Burr-Brown 4341 is accurate to 0.2%+/−2 millivolts with a 10 volt fullscale output. These components would contribute less than 0.1% of fullscale system inaccuracies. Heater resistance feedback would be required to approach this level of accuracy.

Figure 9:
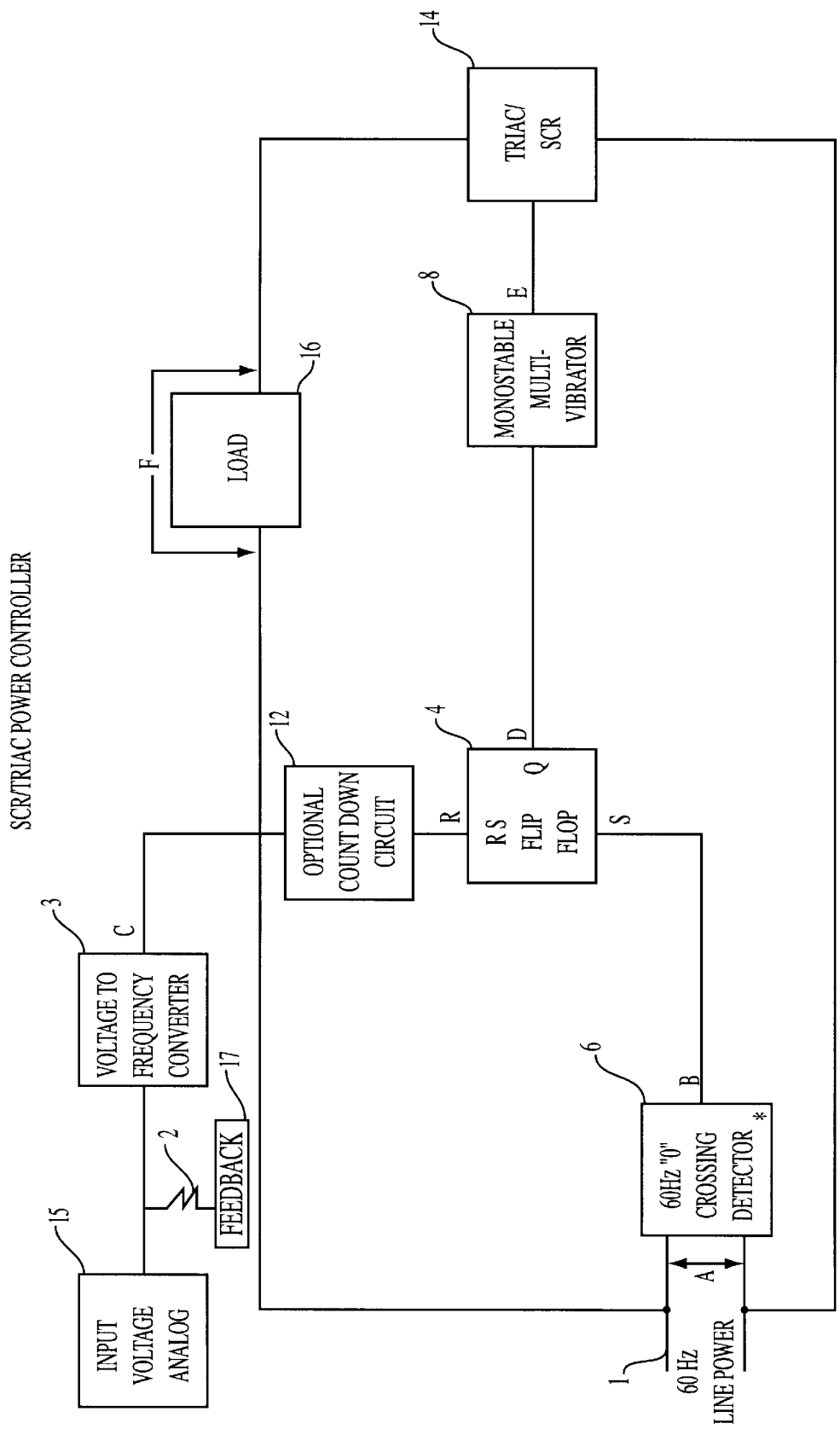
FIG. 9 is a schematic diagram of a power controller in accordance with a fifth embodiment of the present invention.

Other enhancements illustrated in FIG. 9 could improve accuracy still further. The load resistance in most instances is a heater element (2) which will change impedance with temperature. A heater temperature feedback signal (17) could correct for this change to achieve improved accuracy of the system.

It should also be apparent that the output signal of the voltage to frequency converter (3) could be provided by a microprocessor based system. Digital manipulation of feedback (17) and power level demand would control a counter timer which would output a variable frequency signal identical to the voltage converter signal. In other words, the digital manipulation of the control and feedback signals thus produce a digital value of the desired power cycle repetition rate, which would then preset a counter timer after each overflow. The overflow output pulse would thus reproduce the voltage to frequency signal. Additionally, the zero crossover to synchronize the AC line could be input as an interrupt, which would cause an interrogation of the register set by the counter timer overflow. When the register is found set, an output register would output a control signal to a power module. The output register would be reset at a time commensurate with the requirement of the applied power module. This would be another approach which utilizes the power control concept presented in this patent.

In the case of a pressure vessel annealing, many individual heaters are employed to improve uniform heatup. One microprocessor could support several independently controlled heaters, while feedback signals could be shared. The counter timer preset value need not be calculated on a cycle-by-cycle basis, but periodically on a time base adequate for the computer to control several counter timers and their associated heaters. Zonal vessel temperatures and line voltage monitoring signals could be shared for a complete all encompassing annealing heater control system.

The proportional control circuit of the invention may further comprise pre-filtering means for derivation of voltage signals and temperature signals necessary for control.

Accordingly the invention provides a linear high resolution power control circuit for controlling AC power applied to a load through a three terminal AC controller or a silicon controlled rectifier, said power control circuit comprising a converter means responsive to an analog input voltage to produce a first pulse signal of predetermined output pulse width and with a frequency that varies linearly with the amplitude of the input voltage; a detector means for generating a zero crossing second output pulse signal synchronous with the frequency of an AC load power voltage and having a second predetermined output pulse width; and a flip flop means for activating a monostable multivibrator, said first pulse signal being applied to the reset input of said flip flop means, and said pulse signal being applied to the set input of said flip flop means.

The foregoing description of the invention has been presented for purposes of illustration and description. It is not intended to be exhaustive or to limit the invention to the precise form disclosed. Obvious modifications or variations are possible in light of the above teachings.

The presently preferred embodiment described herein illustrates the principles of the invention and its practical application so that one of ordinary skill in the art can utilize the invention in various embodiments and with various modifications as are suited to the particular use contemplated. Accordingly, the scope of the invention is defined by the following claims.

I claim:

1. A linear high resolution power control circuit for controlling AC power applied to a load through a three terminal AC controller or a silicon controlled rectifier, said power control circuit comprising:

a converter means for converting an analog input voltage to a pulse signal with a frequency linearly related to the input voltage, said converter means being capable of providing a first predetermined output pulse width;

a detector means for generating a 60 Hertz or 120 Hz zero crossing second output pulse signal synchronous with an AC input signal synchronized with the said AC power and having a second predetermined output pulse width; and a flip flop means for activating a monostable multivibrator, said converter means controlling the reset input of said flip flop means, and said detector means controlling the set input of said flip flop means.

2. The power control circuit of claim 1, wherein said first and second predetermined pulse widths are approximately 1 microsecond.

3. The power control circuit of claim 1, wherein voltage signal means is interposed between said analog voltage input and said converter means, said signal means comprising an analog multiplier means for multiplying a signal inversely proportional to the RMS line voltage by the input voltage supplied to said converter means.

4. The power control circuit of claim 1, wherein a countdown circuit is arranged between said converter means and said flip flop means for adapting the output from said converter means for controlling said reset input of said flip flop means.

5. The power control circuit of claim 1, further comprising a logic gate means for assuring said multivibrator is controlled by said flip flop means to preclude the instance where the set and reset condition are in coincidence.

6. The power control circuit of claim 1, wherein said converter means, said detector means, said flip flop means, and said logic gate means are assembled in a hybrid module.

7. The power control circuit of claim 1, wherein the functions of said converter means, said detector means, said flip flop means, and said logic gate means are performed by a microprocessor system.

8. The power control circuit of claim 1, wherein said converter means, said detector means, said flip flop means, and said logic gate means are assembled in a monolithic chip.

9. The power control circuit of claim 1, wherein the monostable multivibrator which is connected to the flip flop controls the firing of said AC controller or silicon controlled rectifier which supplies power to the load.

10. A linear high resolution power control circuit for controlling the time-average AC power applied to a load synchronous to the AC load power voltage through a TRIAC or SCR, said power control circuit comprising:

a converter means for converting an analog input voltage to a pulse signal with a frequency linearly related to the input voltage, said converter means being capsule of providing a first predetermined output pulse width;

a detector means for generating a 60 hertz or 120 Hz zero crossing second output pulse signal synchronous with an AC input signal synchronized with the said load power voltage and having a second predetermined output pulse width; and a flip flop means for activating a monostable multivibrator, said converter means controlling the reset input of said flip flop means, and said detector means controlling the set input of said flip flop means.

11. The proportional control circuit of claim 10, further comprising a logic gate means for assuring said multivibrator is controlled by said flip flop means to preclude the instance where the set and reset condition are in coincidence.

12. The proportional control circuit of claim 11 wherein the output of the converter passes to the flip flop through a count down circuit.

13. The proportional control circuit of claim 12, wherein the monostable multivibrator, which is connected to the flip flop, controls the firing of said TRIAC or SCR which supplies power to the load.

14. A power control circuit for alternating current comprising (a) a TRIAC or SCR supplying power to an electrically resistive load, (b) a monostable multivibrator controlling the firing of the TRIAC or SCR, (c) a flip flop controlling the monostable multivibrator, (d) a voltage-to-frequency converter and a zero crossing detector controlling the flip flop, wherein an analog input voltage feeds said converter and the zero crossing detector is connected to 60 Hertz line power.

15. The power control circuit of claim 14, further comprising a logic gate means for assuring said multivibrator is controlled by said flip flop means to preclude the instance where the set and reset condition are in coincidence.

16. The power control circuit of claim 15 wherein the output of the converter passes to the flip flop through a count down circuit.

17. The power control circuit of claim 16 wherein the load is at least one heating element for annealing a nuclear reactor pressure vessel.

18. The power control circuit of claim 17, wherein the functions of said converter, said detector, said flip flop, and said logic gate are performed by a microprocessor system.

19. A linear high resolution power control circuit for controlling AC power applied to a load through a three terminal AC controller or a silicon controlled rectifier, said power control circuit comprising:

a converter means responsive to an analog input voltage to produce a first pulse signal of predetermined output pulse width and with a frequency that varies linearly with the amplitude of the input voltage;

a detector means for generating a zero crossing second output pulse signal synchronous with the frequency of an AC load power voltage and having a second predetermined output pulse width; and a flip flop means for activating a monostable multivibrator, said first pulse signal being applied to the reset input of said flip flop means, and said pulse signal being applied to the set input of said flip flop means.

* * * * *